Patented Mar. 10, 1936

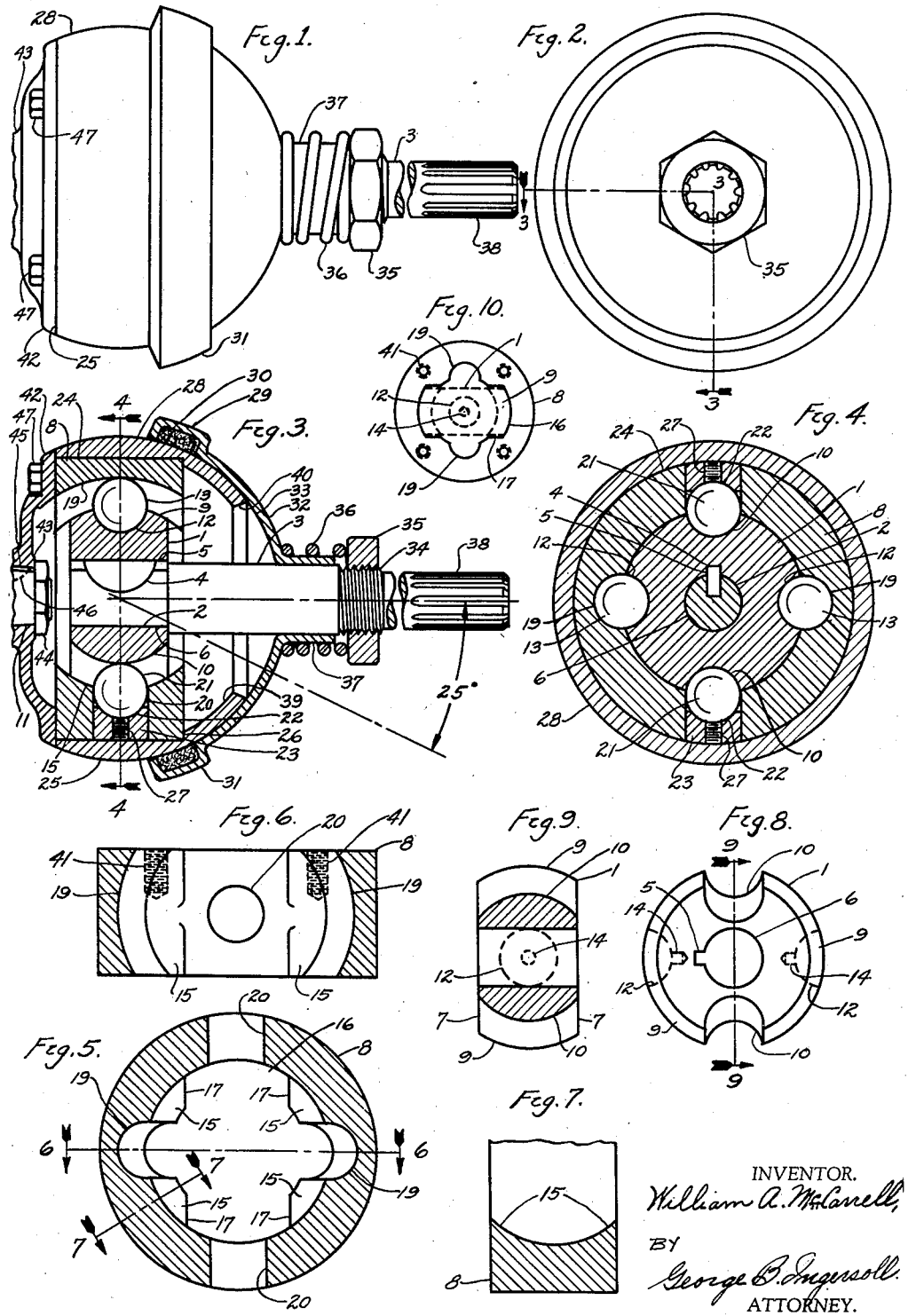
March 10, 1936.   W. A. McCARRELL   2,033,583
UNIVERSAL JOINT MECHANISM
Filed Jan. 6, 1934

2,033,583

UNITED STATES PATENT OFFICE 2,033,583

UNIVERSAL JOINT MECHANISM

William A. McCarrell, Detroit, Mich.

Application January 6, 1934, Serial No. 705,507

14 Claims. (Cl. 64—21)

My invention relates to improvements in universal joint mechanisms in which ball members are used for the driving members; and the objects of my improvements are first, to provide a universal joint mechanism having an inner race in which radial grooves extend longitudinally in a plane parallel with the axis of the inner race and in which ball members are mounted to engage radial grooves in an outer race member, the radial grooves of the outer race member also extending longitudinally in a plane located parallel with the axis of the outer race; second, to provide a universal joint mechanism having inner and outer races each provided with radial grooves for engaging ball members, the radial grooves being located alternately in the inner and outer race members; third, to provide a universal joint mechanism provided with ball members located in sockets in an inner race member for engaging radial grooves in an outer race member; fourth, to provide a universal joint mechanism having ball members located in socket members removably mounted in an outer race member so that the ball members may engage radial grooves in an inner race member; fifth, to provide a universal joint mechanism having ball socket members provided with a means for engaging a tool for removing the ball socket members from their assembled positions within a race member; sixth, to provide a universal joint mechanism having inner and outer members having ball members providing the driving means between the inner and outer members; seventh, to provide a universal joint mechanism having a spherical shaped inner race member engaging a spherical surface of an outer race member; eighth, to provide a universal joint mechanism having its driving members located longitudinally by ball members operatively mounted between the driving members; ninth, to provide a universal joint mechanism having an outer race provided with a spherical shaped surface for engaging a spherical shaped inner race, the outer race being provided with an assembly space or groove to permit the entry of the inner race to its operatively assembled position; tenth, to provide a universal joint mechanism having an outer race member mounted within a spherical shaped reinforcing member; eleventh, to provide a universal joint mechanism having a driven shaft operatively connected with an inner race member and provided with lubricant sealing means mounted on the driven shaft member and an outer race member of the universal joint mechanism; twelfth, to provide a universal joint mechanism having an outer race member provided with assembly grooves or spaces therein to permit the flattened ends of a spherical shaped inner race member to be operatively assembled within the space or grooves of the outer race member; and thirteenth, to provide a universal joint mechanism having a member provided with ball sockets having a hole threaded at the center of the ball sockets to provide a clearance space for the tool used in finishing the ball socket.

I attain these objects by the mechanism illustrated in the accompanying drawing, in which—

Figure 1 is an outside view of the universal joint mechanism; Fig. 2, an end view of the universal joint mechanism disclosed in Fig. 1; Fig. 3, a section through the universal joint mechanism taken on the line 3—3—3, Fig. 2; Fig. 4, a vertical section of the universal joint mechanism taken on the line 4—4, Fig. 3; Fig. 5, a vertical section of the outer race member, said vertical section being taken on the line 4—4, Fig. 3; Fig. 6, a sectional view of the outer race member, said sectional view being taken on the line 6—6, Fig. 5; Fig. 7, a partial sectional view of the outer race member taken on the line 7—7, Fig. 5; Fig. 8, an end view of the inner race member; Fig. 9, a sectional view of the inner race member taken on the line 9—9, Fig. 8; and Fig. 10, a view disclosing the position of the inner race member relative to the outer race member when being assembled.

Similar numerals refer to similar parts throughout the several views.

The inner race 1 is suitably mounted and secured on the shoulder portion 2 of the driven shaft 3, the shoulder portion 2 being provided with a keyway in which is mounted the key 4 which engages the keyway 5 of the inner race 1, the inner race 1 being provided with the central hole or opening 6 through which extends the shoulder portion 2 of the driven shaft 3. The key 4 will thus provide a driving connection between the inner race 1 and the driven shaft 3. The inner race 1 may be provided with a press fit over the shoulder portion 2 of the driven shaft 3, the inner race 1 being thus secured longitudinally on the driven shaft 3, the key 4 preventing the movement of the inner race 1 around or relative to the driven shaft 3. The inner race 1 is provided with oppositely disposed and flattened sides or ends 7 to permit passage therethrough and to provide operative clearance in the assembly space, opening, or groove 16 of the outer race 8 as hereinafter disclosed. The inner race 1 is provided with the spherical surfaces 9 on its outer surface. Also the inner race 1 is provided with the grooves 10 which will be located radially relative to the center of the spherical surfaces 9, said center of the spherical surfaces 9 being located on the center or the axis of the driven shaft 3.

It is also to be noted that the grooves 10 are located so that they extend longitudinally in a plane extending through the center or the axis of rotation of the driven shaft 3, the grooves 10 also extending longitudinally in a plane located on or extending through the center or axis of rotation on the drive shaft 11, a portion of which is disclosed in Fig. 3, when the drive shaft 11 and the driven shaft 3 are in axial alignment.

The inner race 1 is also provided with the sockets or seating surfaces 12 which are constructed with a spherical shape to movably retain the ball members 13 therein. It is also to be noted that the seating surfaces 12 are provided with the small hole or opening 14 at its innermost side, said hole 14 thus providing a clearance or operative space for the grinding member or similar tool which is used to finish machine the seating surfaces 12, thus insuring that there will be complete and perfect finish of the spherical seating surfaces 12 at its innermost centers and eliminating any raised or imperfect surfaces at these points. Also the holes 14 may be used, if desired, for purposes of centering the inner race 1 during the operation of machining and finishing various portions of the inner race 1.

It is to be noted that the seating surfaces 12 will be oppositely disposed to one another about the axis of the inner race 1, the seating surfaces 12 being further located substantially at 90° from a plane extending through the longitudinal centers of the grooves 10.

The outer race 8 is also provided with the spherical surfaces 15 which is engaged by the spherical surfaces 9 of the inner race 1, the inner race 1 thus operatively fitting within the spherical surface 15 of the outer race 8. It is also to be noted that the outer race 8 is provided with the opening, or groove 16, which extends therethrough and forms an assembly space or groove therethrough to permit of the assembly and operation of the inner race 1 within the outer race 8.

It is also to be noted that the opening 16 is disclosed as having the parallel sides or surfaces 17 at its ends, the diameter of the opening 16 being of the same size as the diameter of the spherical surface 15.

The outer race 8 is further provided with the grooves 19 which are constructed on the inside of the inner race 8, said grooves 19 extending longitudinally in a plane through the center or axis of rotation of the drive shaft 11.

It is to be noted that the groove 19 will be located radially relative to the point at which the axes of the drive shaft 11 and the driven shaft 3 coincide when the driven shaft 3 is operating at an angle relative to the drive shaft 11.

It is also to be noted that the grooves 19 will be engaged by the ball members 13 and will be located on opposite sides of the inner surface of the outer race member 8 and substantially at right angles or 90° from the grooves 10 of the inner race 1.

It is also to be noted that the outer race 8 will be provided with the holes, bores or openings 20 which will be located at oppositely disposed sides of the outer race 8 and substantially at right angles or 90° from the grooves 19 of the outer race 8. The holes 20 will be of a size to permit the ball members 21 to movably operate therein, the ball members 21 movably fitting in the seat or spherical surface 22 of the sockets 23, the sockets 23 being slidably mounted in the bore of the openings 20, the sockets 23 having cylindrically shaped surfaces at their outer ends to engage the bore 24 of the retainer 25.

The retainer 25 is provided with the shoulder 26 for retaining the outer race 8 in the bore 24. The sockets 23 are each provided with the tapped hole 27 at their centers to permit the attachment of a threaded member therein for removing the sockets 23 from the bores 20 of the outer race 8 when it is desired to remove said sockets 23 in disassembly. It will thus be seen that the sockets 23 are slidably mounted in the bores 20 and engage the balls 21 to back them up and providing a reaction member for absorbing any thrust loads when said thrust loads are being transferred through the sockets 23 to the retainer member 25. The outer race 8 is backed up and reinforced by the retainer member 25 and may be provided with the spherical surface 28 on its outer side, the spherical surface 28 thus being adapted to be engaged by the lubricant sealing member 29 which is retained in the recess 30 of the boss portion 31 of the member 32, the member 32 being provided with the spherical surface 33 on its inner side to conform to and operatively move adjacent the spherical surface 28 of the retainer member 25.

The driven shaft 3 may be provided with the threaded portion 34 which is adapted to support and be engaged by the nut member 35. The resilient spring 36 is interposed between the nut 35 and the spherical portion of the member 32 and is adapted to always urge the member 32 toward the spherical surface 28 of the retainer member 25 thus tending to maintain the sealing material 29 in sealing engagement with the spherical surface 28. The member 32 is provided with the hub portion 37 which may be provided with a bore and slidably engage the driven shaft 3, the hub portion 37 extending within the resilient member 36.

The driven shaft 3 may be provided with the splined portion 38 which may be suitably constructed to slidably operate in a further extension portion of the driven shaft 3, a said extension portion not being disclosed as this constitutes a conventional way of operatively connecting such a driven shaft 3 with the power transmission portion of a propeller shaft mechanism as commonly used in automotive vehicles and similar units and with which my universal joint mechanism is adapted to be assembled and operated.

Where the retainer member 25 is thus constructed to form a portion of the lubricant sealing mechanism, the retainer member 25 may be constructed with the spherical portion 39 of such length to provide the proper sealing surfaces as indicated by the amount of angular movement that the universal joint mechanism is adapted to provide.

My universal joint mechanism as disclosed in Fig. 3 is shown as being adapted to provide substantially an angular movement of the driven shaft 3 of 25° from each side of the axis of the drive shaft 11, or a total of 50°. However, my universal joint mechanism can be constructed to provide any reasonable amount of angular movement and the above disclosed angular range of 25° on each side of the axis of the drive shaft 11 is merely indicated as disclosing one of the several proper arrangements.

It is to be noted that the spherical portion 39 will be provided with an opening 40 which will be of such size to permit the assembly of the inner race 1 therethrough, the opening 40 further being dictated by the amount of angular movement that is desired to be provided for the driven shaft 3.

It is also to be noted that the retainer member 25 may be constructed of other desired shapes on its outer side where it is desired to accommodate my universal mechanism to various constructions and in which other means are provided with the lubricant sealing operation.

The outer race 8 is further provided with the threaded holes 41 on its forward side to provide for the attachment of the driving flange 42 by the screws 47, to the outer race 8, the driving flange 42 contacting with the forward surface of the outer race 8 and the forward surface of the retainer member 25, thus further locating the outer race 8 in the bore 24 of the retainer member 25. The driving flange 42 may be provided with the boss portion 43 which is partially disclosed in Figures 1 and 3, the boss portion 43 being provided with a bore for receiving the end of the drive shaft 11. The drive shaft 11 may be suitably connected with a driving unit such as the transmission or similar mechanism of automotive vehicle or similar unit to provide driving operation of the universal joint mechanism. The drive shaft 11 is disclosed as having a tapered portion secured in the boss 43 of the drive flange 42 by the nut 44. The drive shaft 11 may be secured in the boss portion 23 by splines or other suitable means.

When desired the boss portion 43 will be provided with the keyway 45 which is engaged by the key 46 which is suitably secured in the drive shaft 11.

It is also to be noted that the flattened ends 7 of the inner race 1 will further provide clearance operation relative to the nut 44 or similar attachment means when the driven shaft 3 is operating at an angle relative to the drive shaft 11.

It is also to be noted that I have provided a universal joint mechanism that will provide a constant velocity operation between the drive shaft 11 and the driven shaft 3, this being very important where propeller shafts are used in various driving positions on automotive vehicles or similar units and where periodical speed fluctuation of the driven shaft will not provide satisfactory operation.

My invention accomplishes uniform angular velocity as a result of the general construction thereof in which two of the balls are mounted in the inner race member and are thus always maintained in positions rotating in a plane extending at right angles with the driven shaft, the other two balls being mounted in the outer race member and thus mounted in positions rotated in a plane extending at right angles to the axis of the drive shaft, this positioning of a portion of the balls in the inner race member with the balance of the balls in the outer race members eliminating any periodical speed fluctuations in the universal joint mechanism, this construction further eliminating any binding of the ball members with the grooves of either the inner or outer race member due to the mounting of two of the balls in the inner race member and two of the balls in the outer race member with the grooves similarly located, which allows for two of the balls always to move with one of the race members and longitudinally relative to the other of the race members.

Actual tests have and will disclose that with one of the shafts oscillating through a range of approximately 25° on each side of its position of alignment with the other of the shafts of the mechanism, an indicator mechanism, operatively connected therewith for recording fluctuations, will disclose substantially no fluctuations in the operation of the universal joint mechanism at any point on either side of its position of alignment with the other of said shafts. Also with the balls of the universal joint mechanism located in planes positioned substantially at 45° from vertical and horizontal planes with one shaft being oscillated through a range of 10° on each side of its position of alignment with the other of said shafts, said indicator mechanism will record absolutely no fluctuation in the operation of the universal joint mechanism at any point within the said 10° of movement at either side of its position of alignment with the other of said shaft, and this test of the universal joint mechanism will represent the worst possible condition in which the balls and race members may be placed, both said 10° range and 25° positions resulting, however, in practically no variations as regarded from a practical operating standpoint. Thus tests will show that my universal joint mechanism will operate with constant and uniform velocity, within said 10° positions each side of an axial line extending through both the drive and driven shafts when both of said drive and driven shafts are in alignment and such a test will conclusively show that my universal joint mechanism operates at constant and uniform velocity through an angle which is greater than the usual and conventional working angle through which universal joint mechanisms of this type are required to operate and the slight possible variations which may be recorded by fluctuation of the indicator mechanism, beyond the 10° range are negligible as the universal joint mechanism will function with successful and practical constant uniform velocity during and through a range of angular movement well within the ordinary commercial requirements of such universal joint mechanisms.

It is also to be noted that whereas I have designated the shaft 11 as being the drive shaft and the shaft 3 as being the driven shaft, it is to be understood that when a vehicle is coasting, the vehicle will then be operating the prime mover of the automotive vehicle in which case the shaft 3 would become a driving member and the shaft 11 would become a driven member. My universal joint mechanism under such circumstances operates to transmit power therethrough in either direction.

It is to be noted that the side view of the inner race 1, as disclosed in Fig. 9, is of the same general outline as the opening 16, when said opening 16 is viewed from the end of the outer race 8, as in Fig. 5. Thus it will be further noted that the inner race 1 may be placed in the end of the opening 16, as disclosed in Fig. 10, the inner race 1 being disclosed therein by dotted lines. With the inner race 1 in the position as disclosed in Fig. 10, the inner race 1 may be slidably moved along the surfaces 17 until the center of the spherical surfaces 9 coincide with the center of the spherical surfaces 15, in which position the inner race 1 may be rotated through an angle of 90° until the inner race 1 occupies the position disclosed in Fig. 3, and in which position the driven shaft may be inserted and assembled within the inner race 1.

It is to be noted that the opening 16 may extend entirely through the outer race 8 so that the inner race 1 may be inserted into the outer race 8 in assembly from either end of the outer race 8.

I claim:

1. In a universal joint mechanism, the combination of an inner race member suitably mounted, an outer race member suitably mounted, and ball members mounted to engage said inner and said outer race members to form a driving means therebetween, the engagement of said ball members with said outer and said inner race members providing means for locating said outer and said inner race members longitudinally relative to one another, a portion of said ball members being retained in said inner race member against movement longitudinally of said inner race member, the remainder of said ball members being retained in said outer race member against movement longitudinally of said outer race member.

2. In a universal joint mechanism, the combination of an inner race member provided with oppositely disposed spherical recesses, an outer race member provided with oppositely disposed spherical seats, ball members movably mounted in the oppositely disposed spherical recesses of said inner race member and engaging said outer race member, and ball members movably mounted in the oppositely disposed spherical seats of said outer race member and engaging said inner race member.

3. In a universal joint mechanism, the combination of an inner race member suitably mounted and provided with a pair of circumferential grooves oppositely disposed therein together with a pair of spherical recesses, an outer race member suitably mounted and provided with a pair of circumferential grooves oppositely disposed therein together with a pair of spherical recesses, ball members mounted in said spherical recesses of said inner race member and engaging the circumferential grooves of said outer race member, and ball members mounted in said spherical recesses of said outer race member and engaging the circumferential grooves of said inner race member.

4. In a universal joint mechanism, the combination of a member suitably supported and provided with sockets, a second member suitably mounted and provided with recesses, members rollably mounted in the sockets of said first mentioned member and engaging said second member, said members being retained by their rolling engagement with said sockets against movement longitudinally of said first mentioned member, and members rollably mounted in the recesses of said second member and engaging said first mentioned member, said last mentioned members being retained by their rolling engagement with said recesses against movement longitudinally of said second member.

5. In a universal joint mechanism, the combination of an outer race member provided with oppositely disposed bores, members slidably mounted in said bores and each provided with a spherical surface, a second race member suitably mounted within said first mentioned race member, ball members movably mounted in the spherical surfaces of said members slidably mounted in the bores of said outer race member and engaging said inner race member, ball members movably mounted in said second race member and engaging said outer race member, and a retainer member around said outer race member and engaging said members slidably mounted in the bores of said outer race member.

6. In a universal joint mechanism, the combination of a driving member provided with a bore, an inner race member suitably mounted and provided with grooves, an outer race member mounted in said bore of said driving member and provided with oppositely disposed bores adapted to permit ball members to be assembled therethrough, ball members in the bores of said outer race member and engaging the grooves of said inner race member, and socket members slidably mounted and retained in the bores of said outer race member, said sockets engaging said ball members, said socket abutting the bore of said driving member.

7. In a universal joint mechanism, the combination of a pair of race members, one of said race members pivotally engaging the other of said race members, ball members suitably mounted to provide driving means between said pair of race members, one half of said ball members being constrained to rotate with one of said race members in a plane extending at right angles thereto, the other half of said ball members being constrained to rotate with the other of said race members in a plane extending at right angles with said last mentioned race member, a sole retainer member supporting one of said pair of race members and provided with a spherical surface, and lubricant sealing means suitably mounted and engaging the spherical surface of said retainer member.

8. In a universal joint mechanism, the combination of a drive shaft provided with a retainer portion having a spherical surface, an outer race member mounted in said retainer portion and provided with a pair of radial grooves oppositely disposed and extending longitudinally with the axis of said drive shaft together with annular spherical surfaces extending between said radial grooves, said outer race member being provided with oppositely disposed bores extending therethrough substantially at right angles to said radial grooves, said outer race member being provided with an opening extending longitudinally therethrough and having wall surfaces connecting with the annular spherical surfaces thereof, socket members mounted in said bores of said outer race member and each provided with a spherical recess, a driven shaft, an inner race member mounted on said driven shaft and provided with a pair of radial grooves oppositely disposed and extending longitudinally with the axis of said driven shaft, said inner race member pivotally engaging said annular spherical surfaces of said outer race member, said inner race member being provided with a pair of spherical recesses located in alignment with said radial grooves of said outer race member, said inner race member being provided with a shape permitting it to be inserted through said opening, extending longitudinally through said outer race member, only while in an initial position in which the axis of said inner race member extends at right angles to the axis of said outer race member, said inner race member being adapted to be rotated, within said outer race member, from its said initial position to its operative position in the universal joint mechanism, ball members engaging the spherical recesses of said socket members and the radial grooves of said inner race member, ball members engaging the spherical recesses of said inner race member and the radial grooves of said outer race member, a housing member mounted on said driven shaft and adapted to move adjacent the spherical surface of said retainer portion, and packing material suitably mounted between the spherical surfaces of said housing member and said retainer portion.

9. In a universal joint mechanism, the combination of an outer race member provided with a spherical seat surface on its inside, an inner member provided with a spherical surface on its outside for engaging said spherical seat surface of said outer race member, and a plurality of ball members rotatably mounted between and engaging said outer and said inner race members to provide driving means therebetween, a portion only of said ball members being adapted to be axially displaced longitudinally of said outer race member, the remainder only of said ball members being adapted to be axially displaced longitudinally of said inner race member.

10. In a universal joint mechanism, the combination of a driving member, a driven member, driving means between said driving and said driven members comprising ball members, a portion of said ball members being retained in said driven member to prevent movement of said portion of said ball members longitudinally of said driven member, the remainder of said ball members being retained in said driving member to prevent movement of said remainder of said ball members longitudinally of said driving member, sockets mounted in said driving member and engaging said remainder of said ball members retained in said driving member, and means for retaining said sockets in said driving member.

11. In a universal joint mechanism, the combination of a driving member provided with a bore, an outer race member mounted in the bore of said driving member, a driven member comprising an inner race member pivotally engaging said outer race member, ball members engaging said outer and said inner race members and providing driving means therebetween, a portion of said ball members being retained in said inner race member and positively located in a plane extending at right angles to the axis of said inner race member, the remainder of said ball members being retained in said outer race member and positively located in a plane extending at right angles to the axis of said outer race member, and sockets slidably mounted in said outer race member and each provided with a spherical surface engaging one of said remainder of said ball members retained in said outer race member, said sockets being adapted to be slidably removed to facilitate assembly of said remainder of said ball members retained in said outer race member, said sockets being each provided with threaded portions for engagement by a member used for slidably removing said sockets from said outer race member, said sockets being provided with outermost end surfaces abutting the inside surface of said bore of said outer race member.

12. In a universal joint mechanism, the combination of an outer race member, an inner race member pivotally mounted in said outer race member, ball members engaging said outer and said inner race members and forming driving means therebetween, one half of said ball members being retained in said outer race member and constrained to always rotate with said outer race member in a plane extending at right angles to the axis of said outer race member, the other half of said ball members being retained in said inner race member and constrained to always rotate with said inner race member in a plane extending at right angles to the axis of said inner race member, a member surrounding said outer race member and provided with a spherical surface on its outer side, and lubricant sealing means suitably mounted to pivotally move with said inner race member and engaging the spherical surface of said member surrounding said outer race member.

13. In a universal joint mechanism, the combination of an outer race member adapted to be rotated, an inner race member, adapted to be rotated, and ball members engaging and forming driving means between said race members, one half of said ball members being constrained to always rotate with said outer race member in a plane extending at right angles to the axis of said outer race member, the remainder of said ball members being constrained to always rotate with said inner race member in a plane extending at right angles with the axis of said inner race member.

14. In a universal joint mechanism, the combination of a pair of race members adapted to be rotated one within the other, and ball members engaging and forming driving means between said race members, said ball members being constrained to always rotate with said race members in a pair of planes when one of said race members is rotating about an axis inclined at an angle with the axis of the other of said race members, each of said planes extending at right angles to the axis of one of said race members, said planes intersecting one another at the point where said axes of said race members intersect one another when inclined one to the other.

WILLIAM A. McCARRELL.